(12) United States Patent
Nilson et al.

(10) Patent No.: US 10,745,108 B2
(45) Date of Patent: Aug. 18, 2020

(54) QUICK DISCONNECT COUPLING FOR A PROPELLER

(71) Applicant: FPV MANUALS LLC, Sarasota, FL (US)

(72) Inventors: Tim Nilson, Sarasota, FL (US); Daniel Nethery, Placida, FL (US); Austin Holbrook, Sarasota, FL (US)

(*) Notice: Subject to any disclaimer, the term of this patent is extended or adjusted under 35 U.S.C. 154(b) by 150 days.

(21) Appl. No.: 15/610,589

(22) Filed: May 31, 2017

(65) Prior Publication Data

US 2017/0349264 A1 Dec. 7, 2017

Related U.S. Application Data

(60) Provisional application No. 62/347,044, filed on Jun. 7, 2016.

(51) Int. Cl.
| | | |
|---|---|---|
| *B64C 11/10* | (2006.01) | |
| *B64D 47/08* | (2006.01) | |
| *F16D 1/108* | (2006.01) | |
| *B64C 11/02* | (2006.01) | |
| *B64C 11/04* | (2006.01) | |
| *B64C 39/02* | (2006.01) | |
| *F16D 1/08* | (2006.01) | |

(52) U.S. Cl.
CPC .............. *B64C 11/10* (2013.01); *B64C 11/02* (2013.01); *B64C 11/04* (2013.01); *B64C 39/024* (2013.01); *B64D 47/08* (2013.01); *F16D 1/08* (2013.01); *F16D 1/108* (2013.01); *B64C 2201/024* (2013.01); *B64C 2201/027* (2013.01); *B64C 2201/042* (2013.01); *B64C 2201/108* (2013.01); *B64C 2201/127* (2013.01)

(58) Field of Classification Search
CPC ....... B64C 11/02; B64C 11/10; B64C 39/024; B64C 2201/027; B64C 2201/042; B64C 2201/108; F16D 1/08; F16D 1/108; E05B 65/0089
USPC ...................................................... 416/204 R
See application file for complete search history.

(56) References Cited

U.S. PATENT DOCUMENTS

| | | | | |
|---|---|---|---|---|
| 2,515,807 | A * | 7/1950 | Spooner ................. | B60D 1/025 411/348 |
| 6,386,789 | B1 * | 5/2002 | Chausse ................ | F16B 21/165 403/322.2 |
| 6,842,946 | B2 * | 1/2005 | Hayden .................. | A47B 95/02 16/414 |
| 10,155,585 | B2 * | 12/2018 | Johannesson ........... | B64C 27/50 |

(Continued)

*Primary Examiner* — Moshe Wilensky
*Assistant Examiner* — Cameron A Corday

(57) ABSTRACT

A coupling is disclosed for connecting a propeller to a motor in an aircraft such as a rotary wing aircraft and the like. The coupling comprises a propeller hub having an inner propeller hub bore defining an axial keyway. A rotatable shaft has an internal shaft bore connected for rotation with the motor. A radial key is slidably located in a radial aperture extending through the rotatable shaft. An actuator is slidably mounted within the internal shaft bore of the rotatable shaft. The radial key is received with the axial keyway for securing the propeller hub to the rotatable shaft. A depression of the actuator retracting the radial key relative to an outer surface of the rotatable shaft for permitting the propeller hub bore to be introduced onto the rotatable shaft.

18 Claims, 10 Drawing Sheets

(56) References Cited

U.S. PATENT DOCUMENTS

| | | | | |
|---|---|---|---|---|
| 2014/0314565 A1* | 10/2014 | Ghapgharan | .......... | H02K 7/003 |
| | | | | 416/1 |
| 2014/0356174 A1* | 12/2014 | Wang | .................... | B64C 39/024 |
| | | | | 416/204 R |
| 2015/0306733 A1* | 10/2015 | Hesse | ........................ | B25F 5/00 |
| | | | | 464/182 |
| 2017/0174323 A1* | 6/2017 | Roberts | ................... | B64C 11/48 |

* cited by examiner

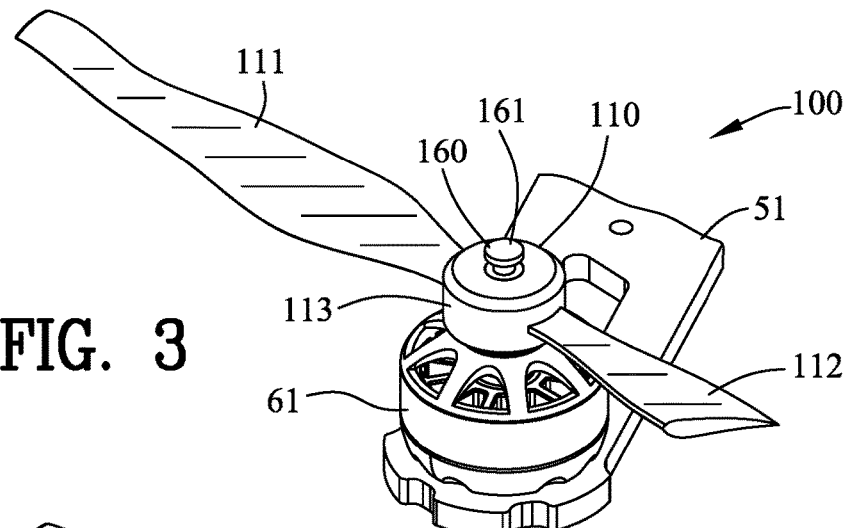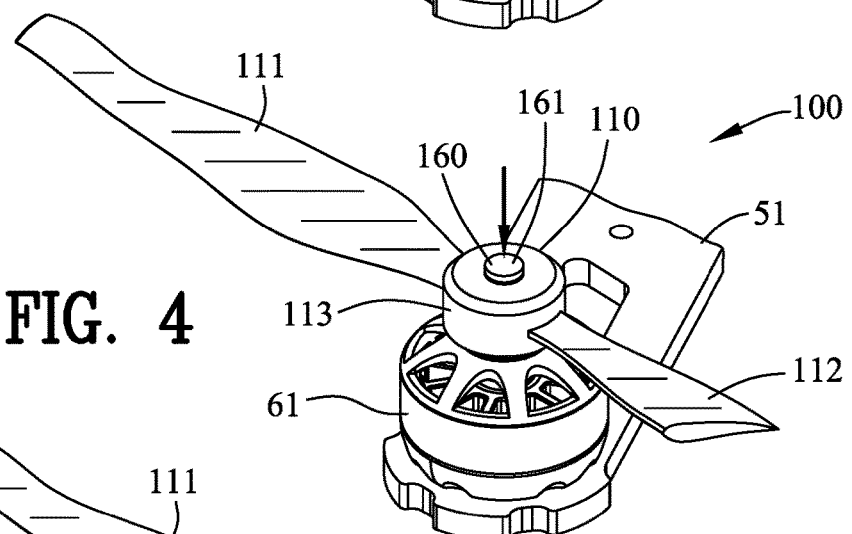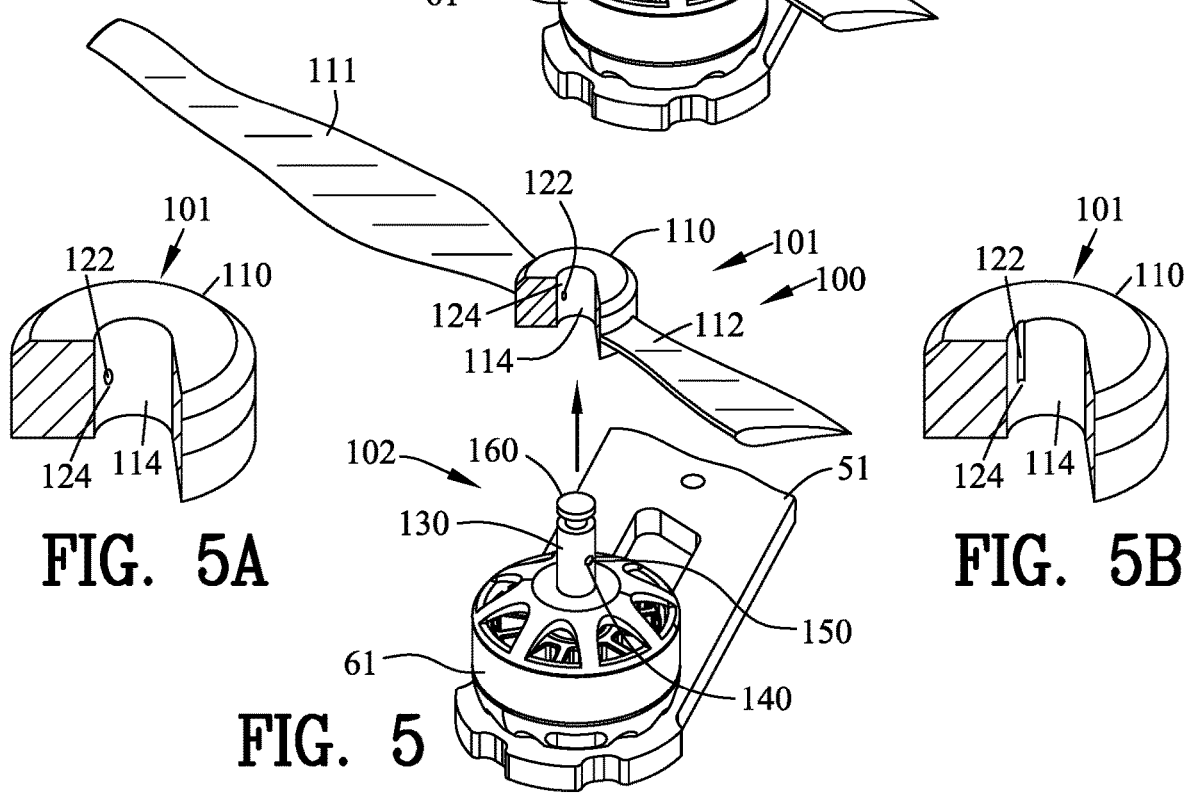

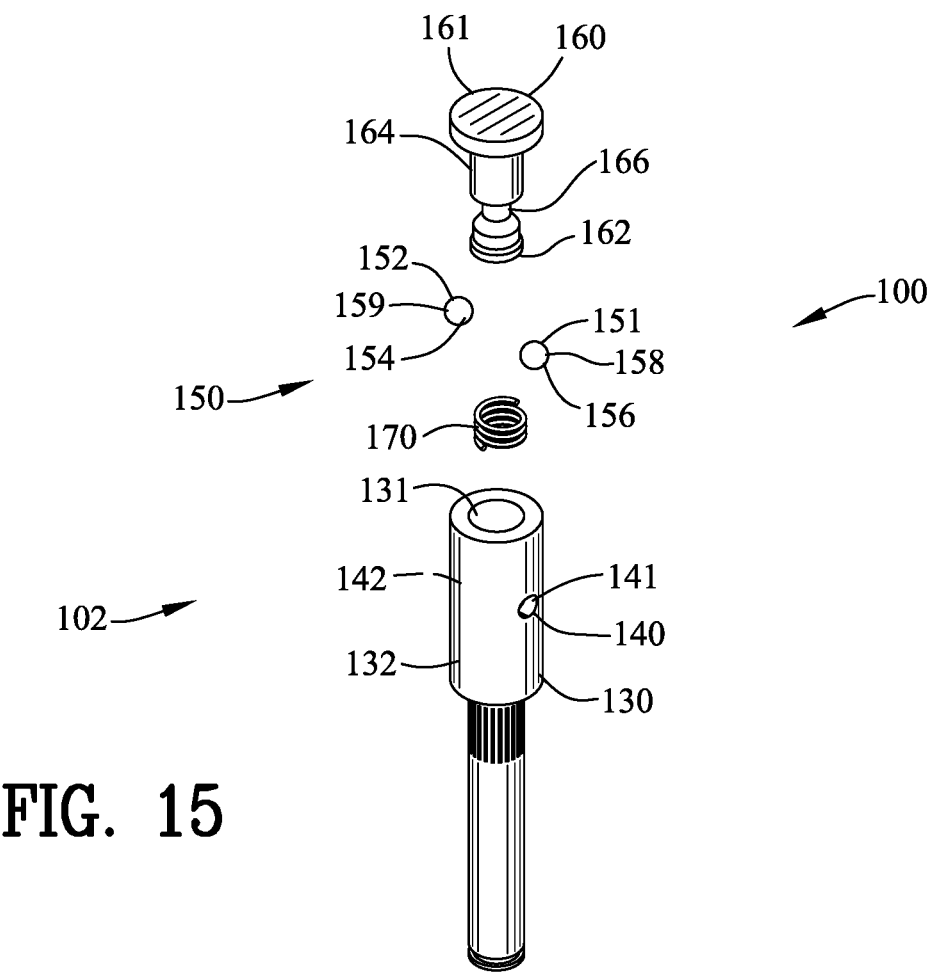
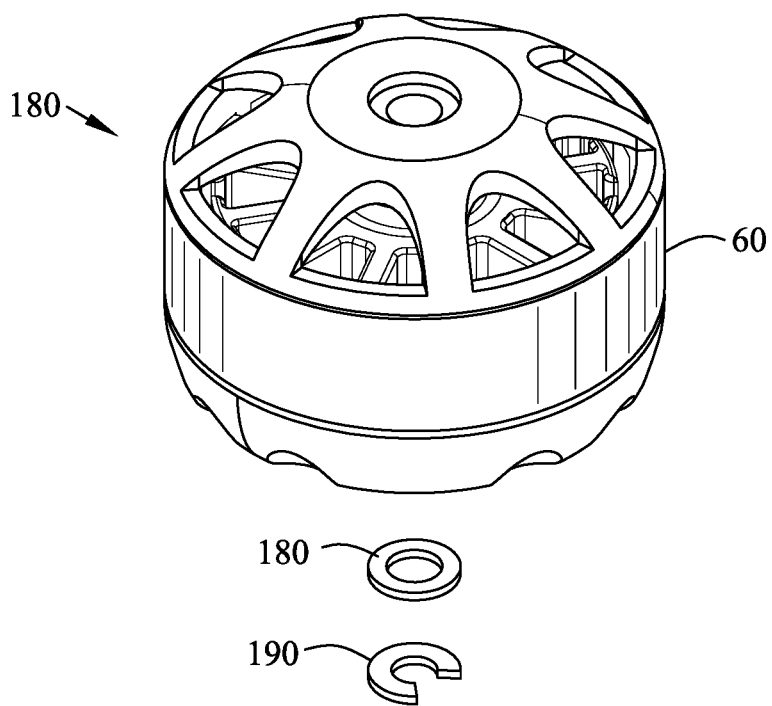
FIG. 15

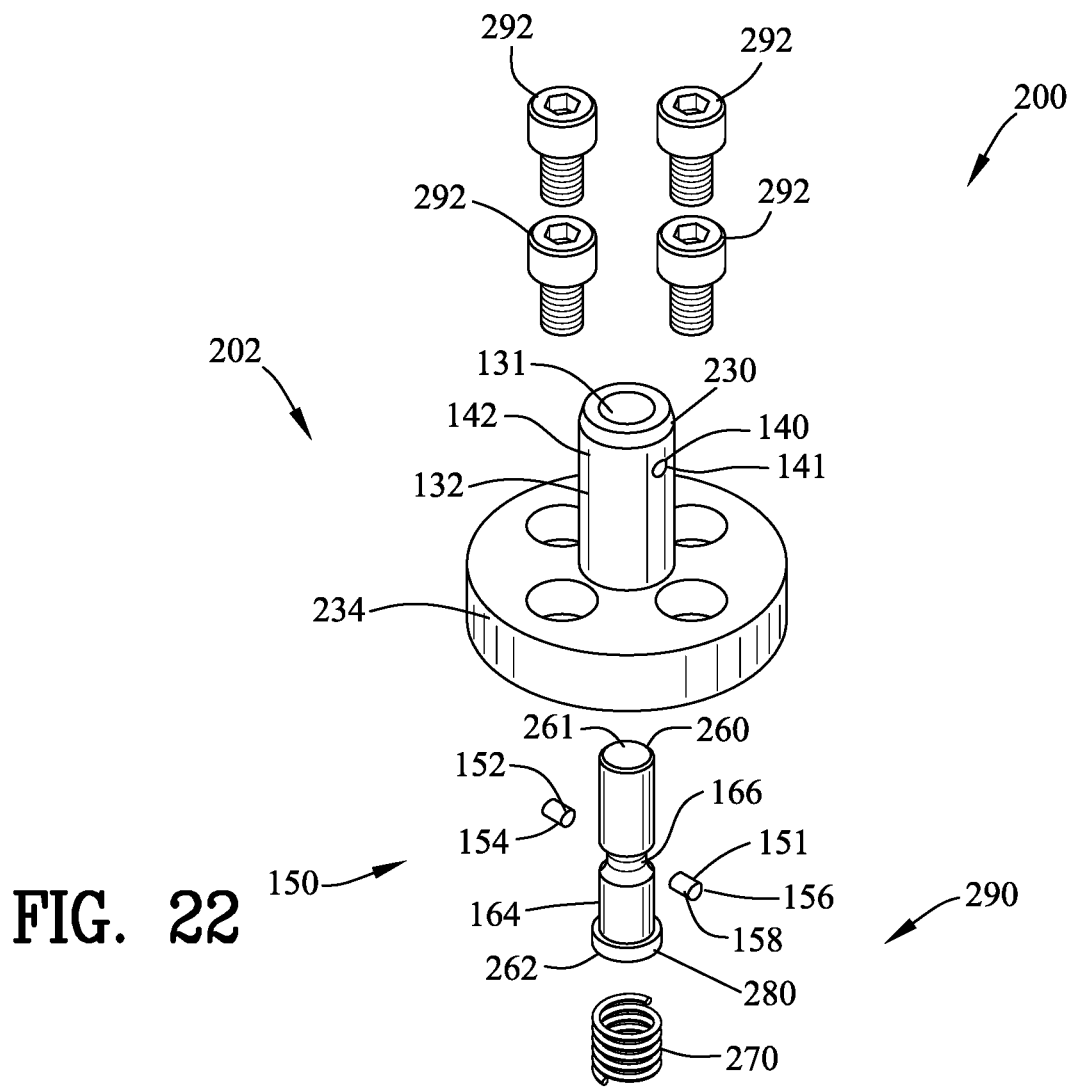
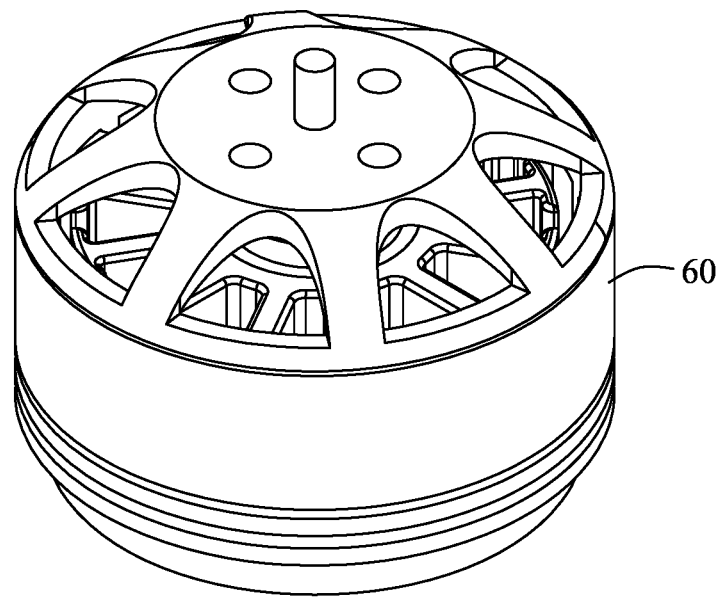
FIG. 22

QUICK DISCONNECT COUPLING FOR A PROPELLER

CROSS-REFERENCE TO RELATED APPLICATIONS

This application claims benefit of U.S. Patent Provisional application No. 62/347,044 filed Jun. 7, 2016. All subject matter set forth in provisional application No. 62/347,044 is hereby incorporated by reference into the present application as if fully set forth herein.

BACKGROUND OF THE INVENTION

Field of the Invention

This invention relates to aircraft and more specifically to an improved quick disconnect coupling for a propeller.

Description of the Related Art

The popularity of remote controlled aircraft has dramatically increased over the last several years. One of the most popular remote controlled aircraft is a rotary wing aircraft commonly referred to as a helicopter. These rotary wing aircraft are used by hobbyists and commercial enterprises for photographing, video recording as well as surveillance. Some companies are experimenting with delivering of goods through remotely controlled rotary wing aircraft.

In general, there are two types of remote controlled rotary wing aircraft. The first type of rotary wing aircraft is commonly referred to as a conventional helicopter aircraft. In the conventional helicopter aircraft-type rotary wing aircraft, the rotor blade or blades are mounted within or above the aircraft frame or fuselage.

The second type of rotary wing aircraft is commonly referred to as quadcopter rotary wing aircraft. One type of quadcopter rotary wing aircraft is an H-type rotary wing aircraft. In the H-type rotary wing aircraft, a plurality of arms extend from the aircraft frame or fuselage with each of the plurality of arms supporting a motor rotating a rotor blade. The plurality of rotor blades provides lift and forward propulsion to the rotary wing aircraft. A differential in rotation of the plurality of rotor blades provide steering of the rotary wing aircraft.

Typically, each of the rotor blades is secured to the motor by a threaded connector such as a nut, threadably engaged to a threaded shaft. To replace the rotor blade, an operator would use a wrench or nut driver to remove the nut to replace the old rotor blade with a new rotor blade. In many competitive events such as rotary wing aircraft races, the time required to replace one or more rotor blades severely handicapped a competitor.

Therefore, it is an object of the present invention to provide an improved quick disconnect coupling for a rotary wing aircraft that enables quick change of a propeller.

Another object of this invention is to provide an improved quick disconnect coupling for a propeller that accommodates different types of propellers.

Another object of this invention is to provide an improved quick disconnect coupling for a propeller that is simple for the operator to use.

Another object of this invention is to provide an improved quick disconnect coupling for a propeller that is cost effective to produce.

Another object of the present invention is to provide an improved quick disconnect coupling for a propeller that does not add additional weight to the aircraft.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved coupling for connecting a propeller to a motor. The coupling comprises a propeller coupling portion and a motor coupling portion. The propeller coupling portion includes a propeller hub supporting a propeller blade. An inner propeller hub bore defines an axial keyway defined in the propeller hub. The motor coupling portion includes a rotatable shaft having an internal shaft bore connected for rotation with the motor. A radial aperture extends through the rotatable shaft. A radial key is slidably located in the radial aperture. An actuator is slidably mounted within the internal shaft bore of the rotatable shaft. A depression of the actuator retracts the radial key relative to an outer surface of the rotatable shaft to introduce the propeller hub bore onto the rotatable shaft. A spring biases the actuator into a non-depressed position for extending the radial key to engage with the axial keyway of the propeller hub bore to couple the propeller to the motor.

In a more specific example of the invention, the axial keyway extends only partially through the hub inner bore. Preferably, the radial key is a sphere. A radial key stop inhibits removal of the radial key from the radial aperture. The actuator includes an annular relief defined in an actuator outer diameter of the actuator. The annular relief retracts and extends the radial key relative to an outer surface of the rotatable shaft upon movement of the actuator between the depressed and non-depressed position. A depression of the actuator aligns the annular relief adjacent to the radial aperture for retracting the radial keys relative to the outer surface of the rotatable shaft to introduce the propeller hub bore onto the rotatable shaft. The spring axially returns the annular relief to be adjacent to said plurality of radial apertures for extending the radial key to engage with the axial keyway of the propeller hub bore to couple the propeller to the motor. A retainer retains the actuator within the internal shaft bore of the shaft against the bias of the spring.

A motor fastener fastens the motor coupling portion to the motor. In one example, the motor coupling portion is a shaft of the motor. In another example, the rotatable shaft is an armature shaft of the motor.

The invention is also incorporated into a coupling for connecting a propeller to a rotatable shaft. The rotatable shaft has a radial key movable between a retracted position and an extended position from the rotatable shaft. The coupling comprises a propeller having a hub defining a hub inner bore for slidably mounting to the rotatable shaft when the radial key is moved into the retracted position. An axial keyway is defined in the hub inner bore for receiving the radial key for coupling the propeller to the rotatable shaft when the radial key is moved into the extended position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 3 is an enlarged partial view of FIG. 2 illustrating one of the propellers coupled to a motor;

FIG. 4 is a view similar to FIG. 3 illustrating a depression of an actuator for decoupling the propeller from the motor;

FIG. 5 is a view similar to FIG. 4 illustrating the removal of the propeller from the motor;

FIG. 5A is a magnified view of a portion of FIG. 5;

FIG. 5B is a view similar to FIG. 5A illustrating a variation of propeller hub;

FIG. 15 is an enlarged exploded isometric view of FIG. 12;

FIG. 22 is an enlarged exploded isometric view similar to FIG. 15 illustrating an alternate mounting for securing the coupling of the present invention to a motor;

Similar reference characters refer to similar parts throughout the several Figures of the drawings.

DETAILED DISCUSSION

Figure 1:
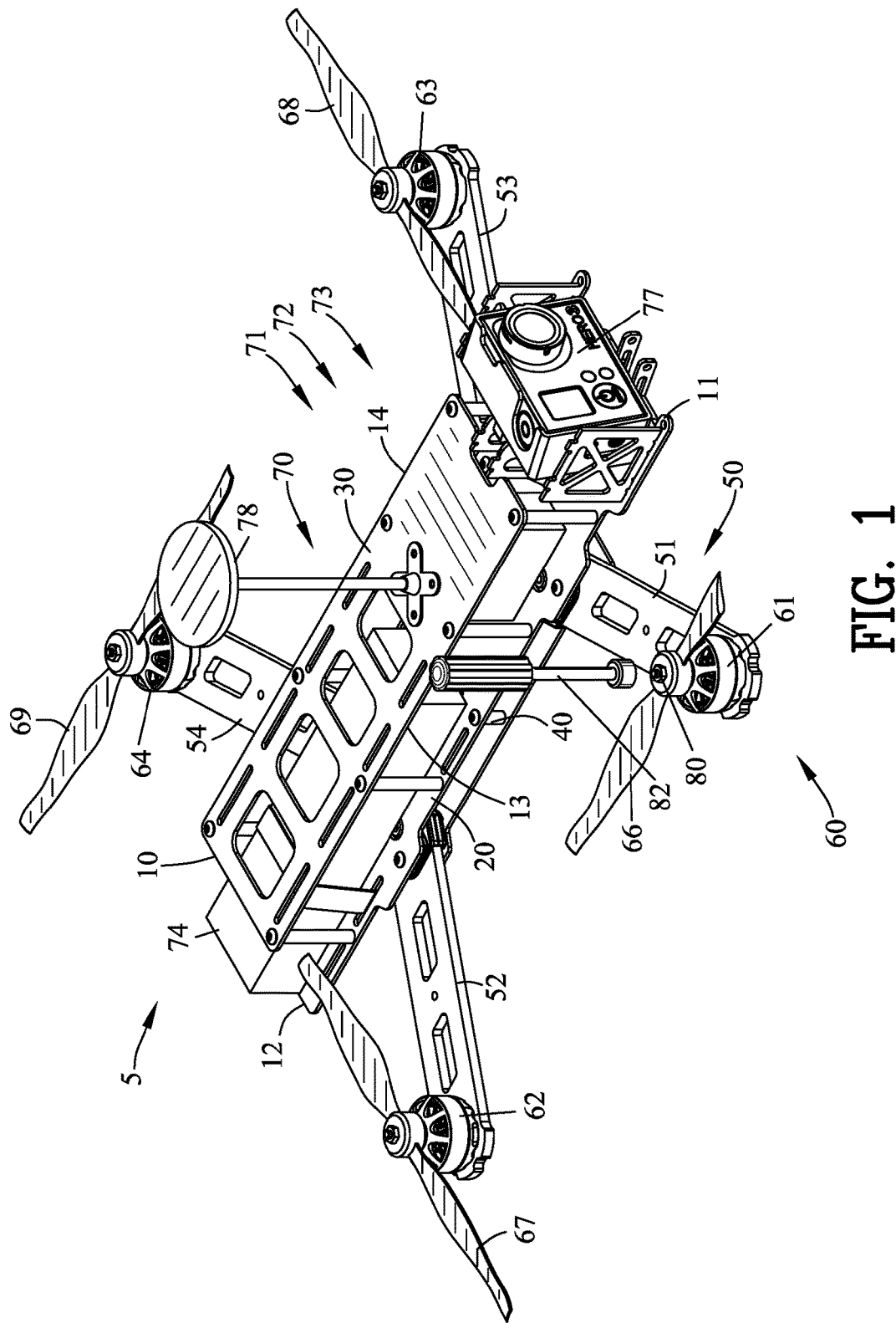
FIG. 1 is an isometric view of a rotary wing aircraft of the prior art incorporating a conventional coupling for mounting a propeller.

FIG. 1 illustrates a rotary wing aircraft 5 shown as an unmanned rotary wing aircraft of the prior art. Although the rotary wing aircraft 5 has been shown as unmanned rotary wing aircraft, it should be understood that the present invention is applicable to other types of aircraft.

The rotary wing aircraft 5 comprises a frame 10 extending between a first and a second end 11 and 12 bounded by a first and a second edge 13 and 14. The frame comprises a power frame 20 shown as a bottom frame 20 and a carrier frame 30 shown as a top frame. Although the power frame 20 has been shown as a bottom frame and the carrier frame 30 has been shown as a top frame, the arrangement may be reversed with the carrier frame 30 being a bottom frame and the power frame 20 being a top frame. A plurality of resilient couplers 40 interconnect the power frame 20 to the carrier frame 30 to isolate the power frame 20 from the carrier frame 30.

The plurality of arms 50 shown as arms 51-54 extend from the power frame 20 in a pattern commonly referred to as an H frame pattern. Each of the plurality of arms 51-54 are connected to the power frame 20. The plurality of arms 50 support a plurality of electric motors 60 for driving a plurality of propellers 65. The plurality of arms 51-54 support electric motors 61-64 for driving propellers 66-69. The plurality of electric motors 61-64 are individually controlled through electrical conductors (not shown) as should be well known to those skilled in the art.

The carrier frame 30 is adapted to receive a variety of electronic components and other accessories to enabling remote flight, remote sensing and/or remote delivery of items.

The plurality of resilient couplers 40 isolate vibration generated by the plurality of electric motors 61-64 driving propellers 65-69 present in the power frame 20 from the electronic components, accessories and/or items present in the carrier frame 30. The reduction of vibration within the carrier frame 30 provides for enhanced operation of the electronic components, accessories and/or payloads in or on the carrier frame 30.

A variety of flight electronic components 70 enabling remote flight are mounted to the carrier frame 30. In this example, flight electronics components 70 include an electronic flight control 71 and a transceiver 72 and an optional GPS system 73. A battery 74 is mounted to the carrier frame 20 by suitable means such as a tension strap 75 and the like.

A flight camera 77 is mounted to the carrier frame 30 at the first end 11 of the frame 10 for showing the actual flight direction and attitude of the rotary wing aircraft 5. The flight camera 77 enables an operator to visually determine the flight direction and attitude to remotely fly the rotary wing aircraft 5. An antenna array 78 is mounted upon the carrier frame 30. The antenna array 78 is connected to the electronic flight control 71 and the transceiver 72 and the optional GPS system 73 and the flight camera 77 for communication with a remote operator station (not shown) for flying the rotary wing aircraft 5 and for exchanging information between the rotary wing aircraft 5 and the remote operator station (not shown).

Each of the plurality of propellers 65 were secured to shafts extending from the plurality of electric motors 60 by a plurality of nuts 80. In order to replace one of the plurality of propellers 65, a nut driver 82 or a wrench was used to remove the nut 80 to replace the old rotor blade with a new rotor blade.

Figure 2:
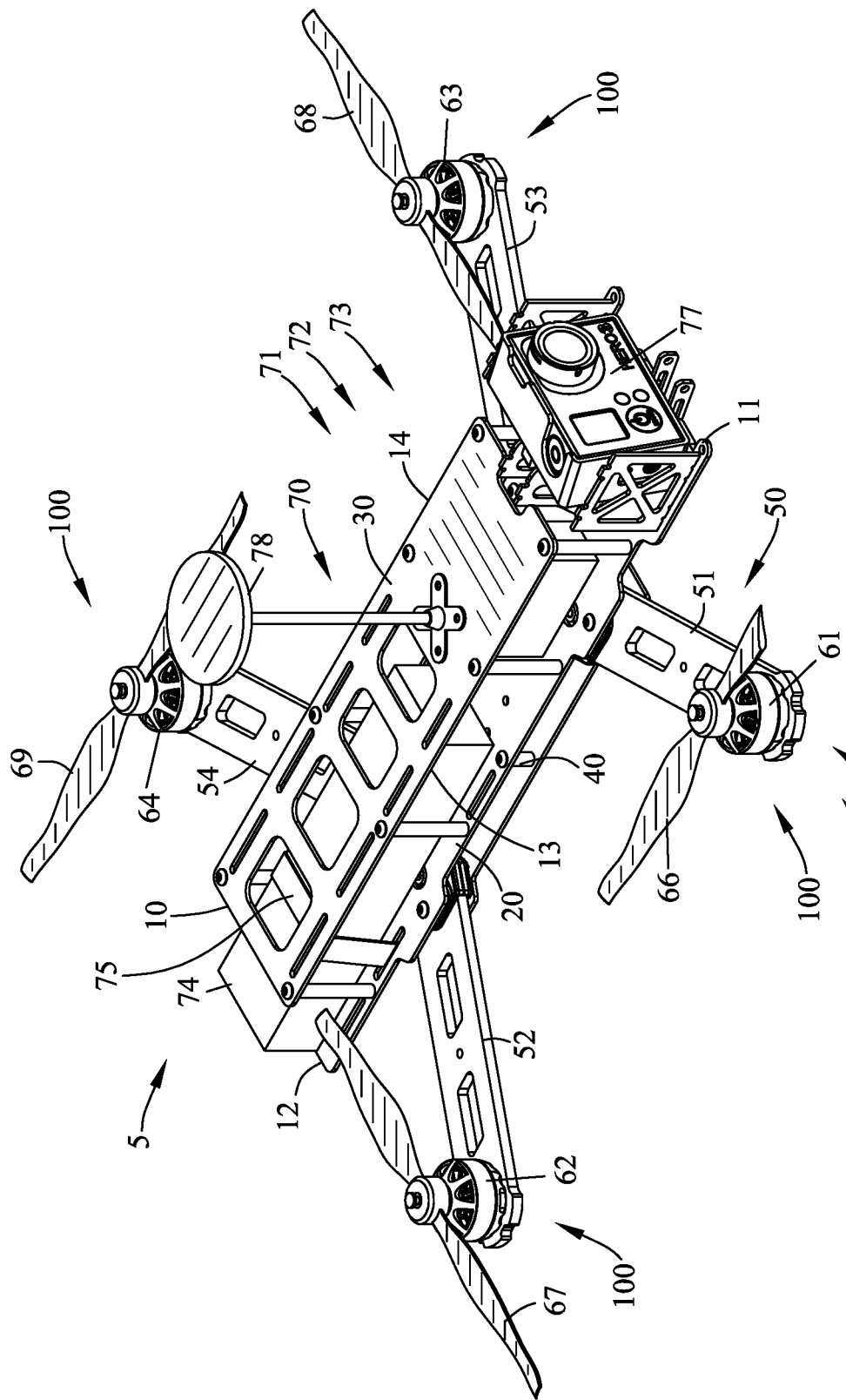
FIG. 2 is an isometric view of a rotary wing aircraft incorporating the quick disconnect coupling for coupling a propeller to a motor.

FIG. 2 is an isometric view of the rotary wing aircraft of FIG. 1 with a quick disconnect coupling 100 of the present invention. The quick disconnect coupling 100 of the present invention couples the propellers 65 to the motors 60. The coupling 100 enables an operator to quickly and simply change the propellers 65. As will become apparent hereinafter, an operator can quickly and simply change the propellers 65 by depressing an actuator to remove an old propeller and to insert a new propeller.

FIG. 3 is an enlarged partial view of FIG. 2 illustrating the propeller 66 coupled to the motor 61. It should be appreciated that the remaining propellers 67-69 operate in an identical fashion. The coupling 100 comprises a propeller coupling portion 101 and a motor coupling portion 102.

FIG. 4 is a view similar to FIG. 3 illustrating a depression of an actuator for decoupling the propeller 66 from the motor 61. The depression of the actuator permits removal of the propeller 66.

FIG. 5 is a view similar to FIG. 4 illustrating the removal of the propeller 66 from the motor 61. The removal of the propeller 66 from the motor 61 permits the introduction of a new or different propeller on the motor 61.

Figure 8:
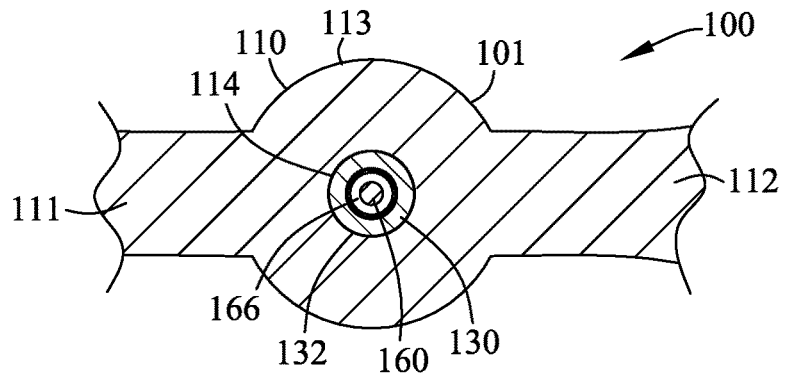
FIG. 8 is an enlarged sectional view along line 8-8 in FIG. 6.
Figure 7:
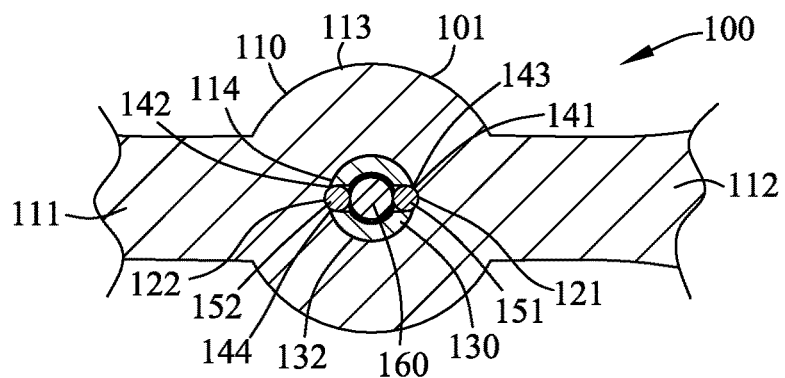
FIG. 7 is an enlarged sectional view along line 7-7 in FIG. 6.
Figure 6:
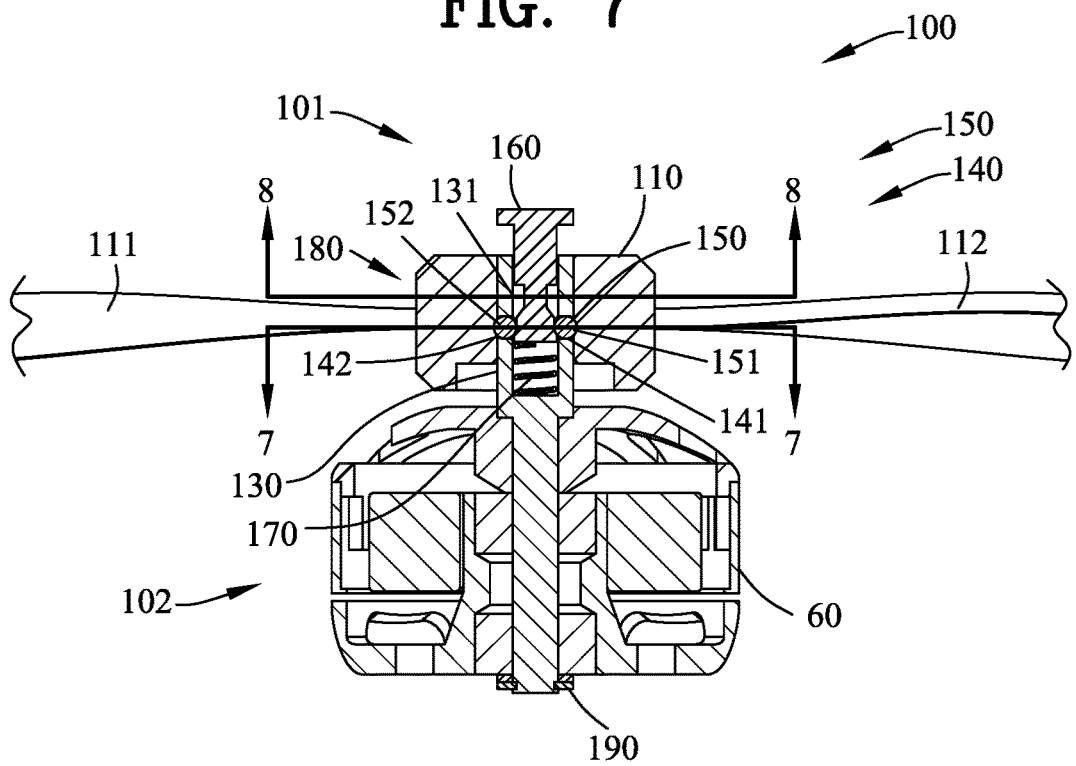
FIG. 6 is a magnified sectional view of the propeller coupled to the motor shown in FIG. 3
Figure 11:
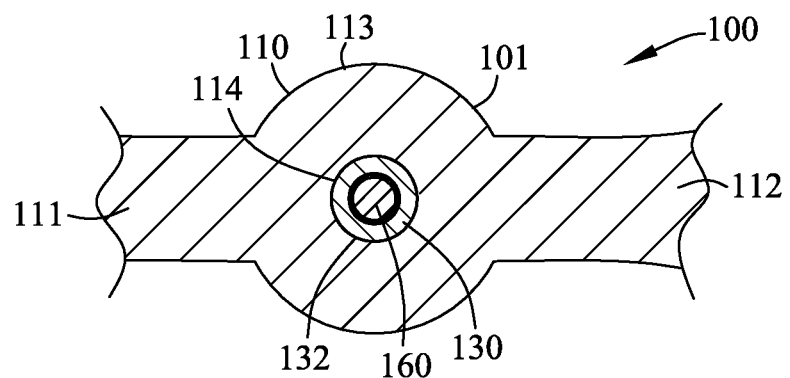
FIG. 11 is an enlarged sectional view along line 11-11 in FIG. 9.
Figure 10:
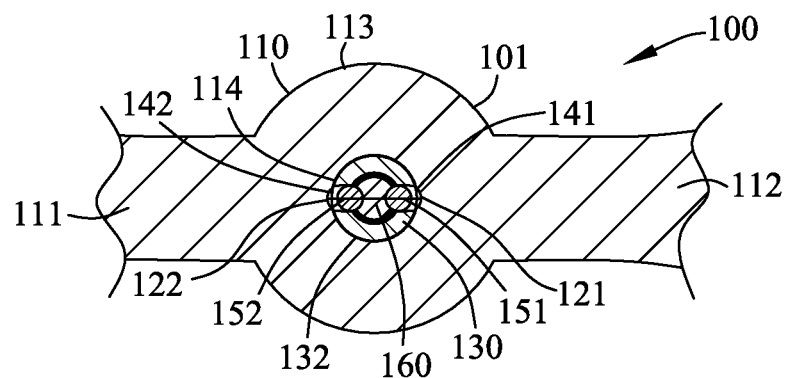
FIG. 10 is an enlarged sectional view along line 10-10 in FIG. 9.
Figure 9:
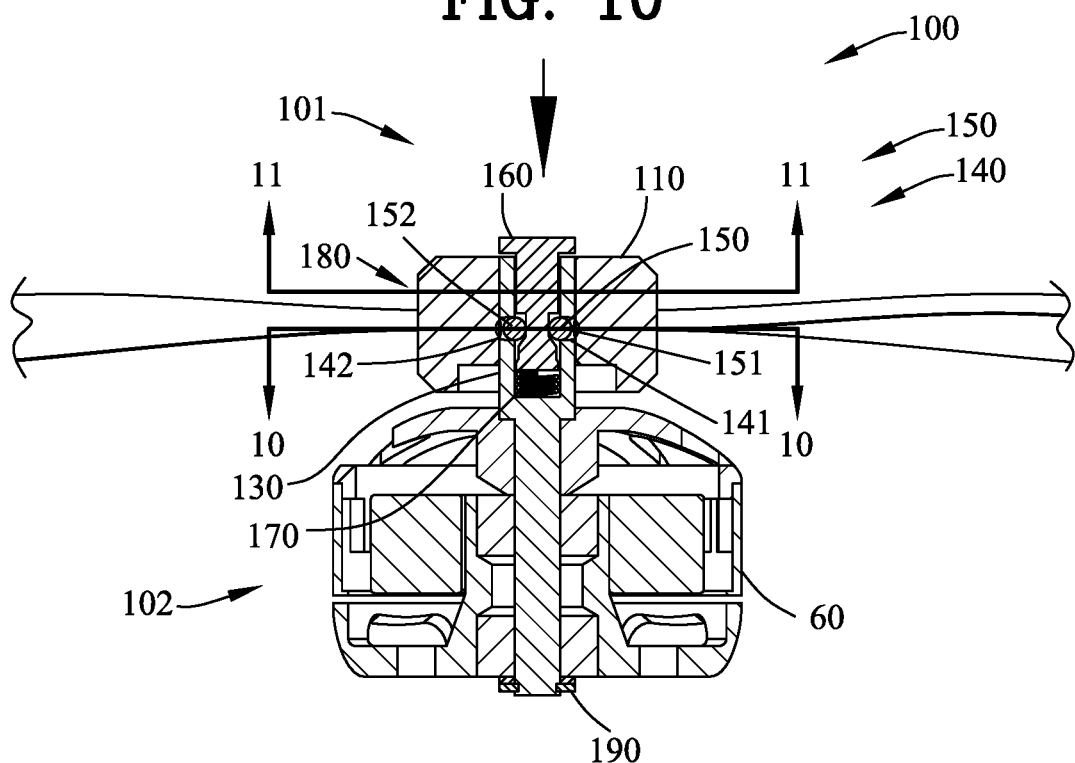
FIG. 9 is a magnified sectional view of the depression of the actuator for decoupling the propeller from the motor shown in FIG. 4.

FIGS. 6-8 are magnified views of the propeller 66 coupled to the motor 61 shown in FIG. 3. The propeller coupling portion 101 includes a propeller hub 110 supporting a first blade 111 and a second blade 112. Although only two propeller blades 111 and 112 have been shown, it should be understood that a variety of blade configurations may be used with the present invention.

The propeller hub 110 has an outer hub diameter 113 and a propeller hub inner bore 114. An axial keyway 120 is defined in the propeller hub inner bore 114. In this example, a first and a second axial keyway 121 and 122 are defined in the propeller hub inner bore 114 of the propeller hub 110. Each of the plurality of axial keyways 121 and 122 extends only partially through the hub inner bore 114 defining an axial keyway end wall 124. The axial keyway end wall 124 maintains the position of the propeller hub 110 on the rotating shaft 130 against the force of the thrust of the propeller.

Preferably, each of the plurality of axial keyways 121 and 122 is a hemispherical recess defined in the propeller hub inner bore 114 as best shown in FIG. 5. Although only two axial keyways 121 and 122 have been shown, it should be understood that a variety in number and shapes and configurations may be used with the present invention.

FIGS. 15-18 are enlarged view further showing the motor coupling portion of FIG. 6. The motor coupling portion 102 includes a rotatable shaft 130 having an internal shaft bore 131 and an outer shaft surface 132. A radial aperture 140 extends from the internal shaft bore 131 to the outer shaft surface 132 defining a radial aperture length. In this embodiment, a first and a second radial aperture 141 and 142 extend from the internal shaft bore 131 to the outer shaft surface 132. A first and a second radial key stop 143 and 144 are located proximate to the outer shaft surface 132 of the rotatable shaft 130. The formation and the function of the first and second radial key stops 143 and 144 will be described in greater detail hereinafter. The first and second radial apertures 141 and 142 are located on the rotatable shaft 130 to cooperate with the first and second axial keyways 121 and 122 defined in the propeller hub inner bore 114 of the propeller hub 110.

A radial key 150 is slidably located in the radial aperture 140. In this example, a first and a second radial key 151 and 152 are slidably located in the first and second radial apertures 141 and 142 of the rotatable shaft 130. Each of the first and second radial keys 151 and 152 has an inner key portion 154 and an outer key portion 156 defining a radial length 158 greater than each of the radial aperture lengths of each of the first and second radial apertures 141 and 142. In this example, each of the first and second radial keys 151 and 152 are shown as spheres 159 but it should be understood that the first and second radial keys 151 and 152 make take a variety of shapes as show in FIG. 22.

The first and second radial key stops 143 and 144 maintain the first and second radial keys 151 and 152 within the first and second radial apertures 141 and 142. In one example, the outer shaft surface 132 of the rotatable shaft 130 is reformed to reduce the size of the first and second radial apertures 141 and 142 adjacent to the outer shaft surface 132 of the rotatable shaft 130.

An actuator 160 extends between a first end 161 and a second end 162. The actuator 160 has an actuator outer diameter 164 slidably received with the internal shaft bore 131 of the rotatable shaft 130. An annular relief 166 is defined in the actuator outer diameter 164 of the actuator 160. The annular relief 166 functions in concert with the radial keys 151 and 152 and the radial apertures 141 and 142 to engage with the axial keyway 121 and 122 in the propeller hub inner bore 114 of the propeller hub 110.

A spring 170 coacts between the rotatable shaft 130 and the actuator 160. The spring 170 biasing the actuator 160 into a non-depressed position as shown in FIGS. 6-8 whereat the annular relief 166 is misaligned relative to the radial apertures 141 and 142. In the non-depressed position, the outer shaft surface 132 forces the radial key into engagement with the axial keyway 121 and 122 of the propeller hub bore 114 to couple the propeller 66 to the motor 61.

A retainer 180 for retaining the actuator 160 within the internal shaft bore 131 of the rotatable shaft 130 against the bias of the spring 170. The actuator 160 is prevented from exiting the internal shaft bore 131 of the rotatable shaft 130 by the interference engagement of the radial keys 151 and 152 with the actuator outer diameter 164 of the of the actuator 160.

A motor fastener 190 fastening the motor coupling portion 102 of the coupling 100 to the motor 61. In this example, the rotatable shaft 130 is unitary with the armature shaft of the motor 62. The dual combined use of the rotatable shaft 130 for the coupling 100 as well as the armature shaft of the motor 62 provides an improved quick disconnect coupling 100 for a propeller 61 that does not add additional weight to the aircraft.

FIGS. 9-11 and 19-21 are magnified views of the depression of the actuator 160 for decoupling the propeller 66 from the motor 61 shown in FIG. 4. A depression of the actuator 160 locates the annular relief 166 of the actuator 160 adjacent to the plurality of radial apertures 141 and 142 enabling the inner key portion of the plurality of radial keys 151 and 152 to enter into the annular relief 166 in the actuator 160. The retracting first and second radial keys 151 and 152 into the annular relief 166 of the actuator 160 move the outer key portion of the plurality of radial keys 151 and 152 within the outer shaft surface 132 of the rotatable shaft 130 permitting removal and insertion of a propeller hub 110 onto the rotatable shaft 130.

Figure 14:
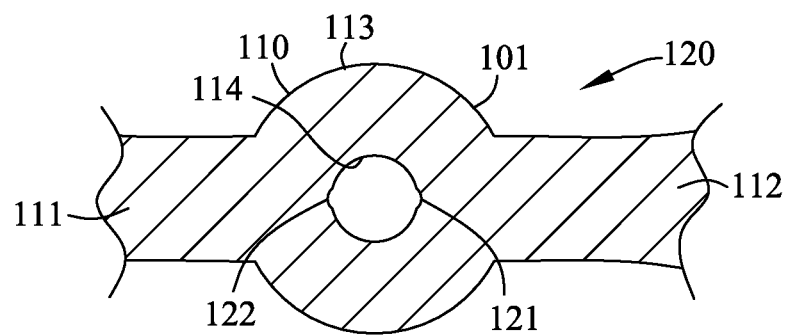
FIG. 14 is an enlarged sectional view along line 14-14 in FIG. 12.
Figure 13:
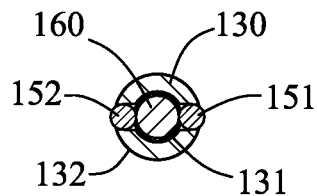
FIG. 13 is an enlarged sectional view along line 13-13 in FIG. 12.
Figure 12:
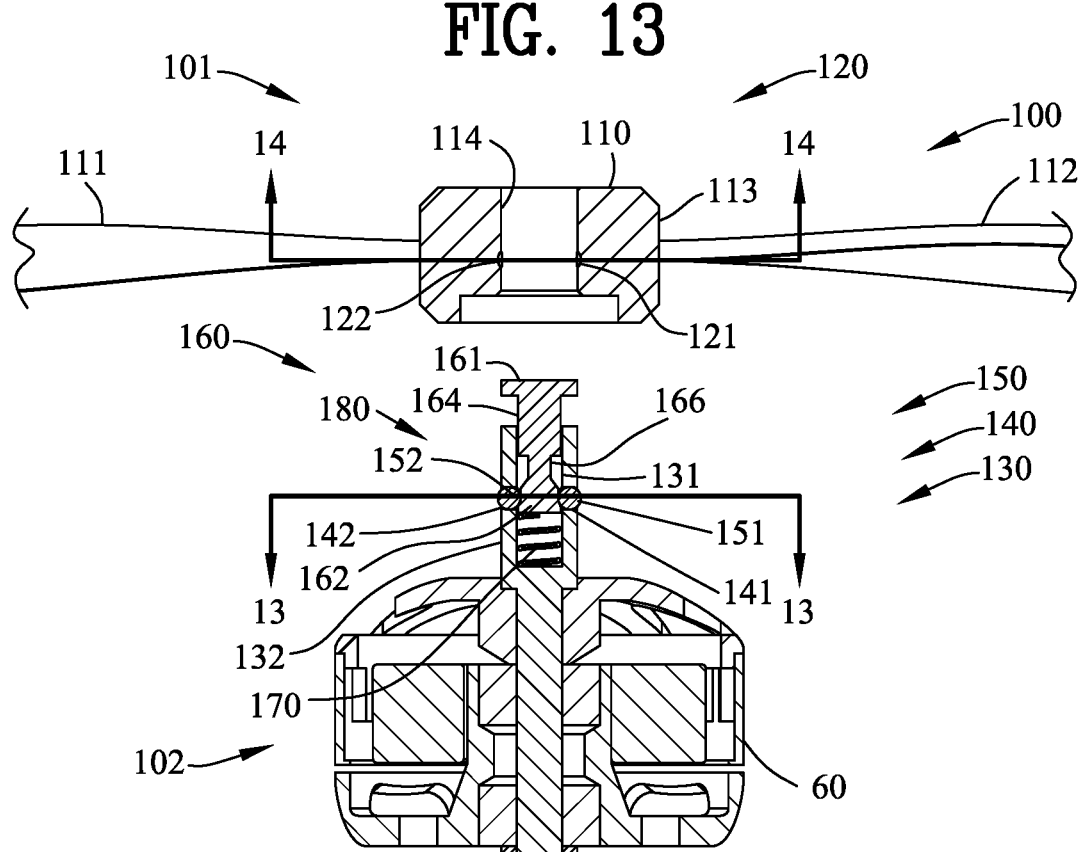
FIG. 12 is a magnified sectional view of the removal of the propeller from the motor shown in FIG. 5.
Figure 16:
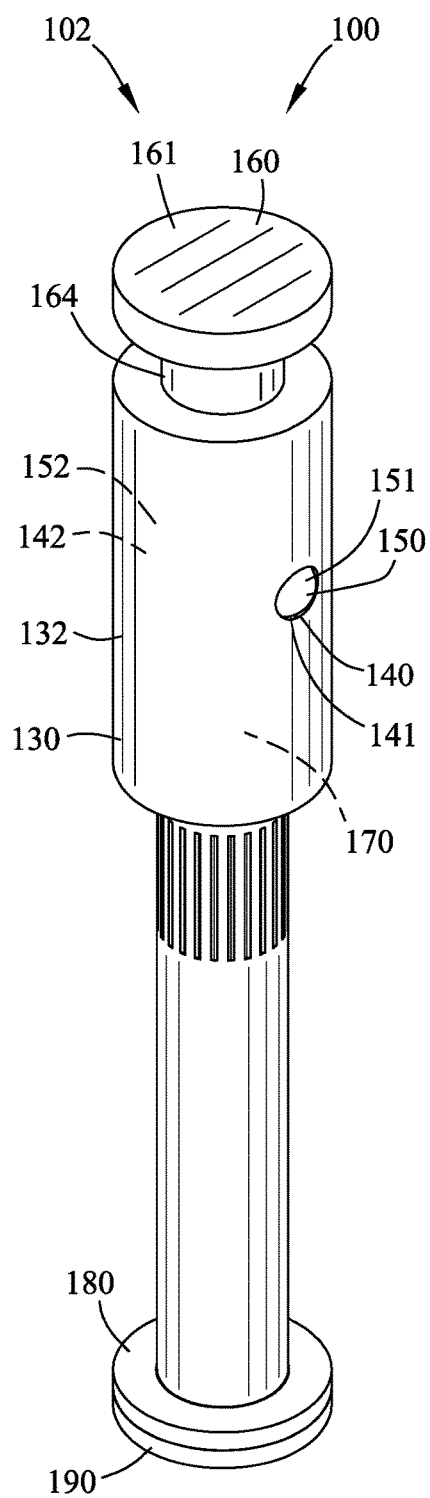
FIG. 16 is magnified isometric view of the coupling shown in FIG. 15.
Figure 17:
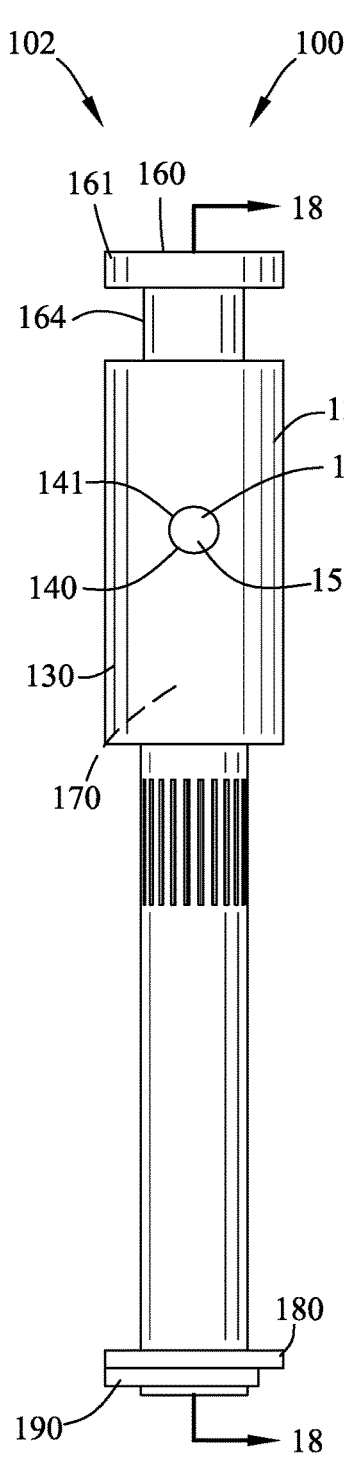
FIG. 17 is a side view of FIG. 16.
Figure 18:
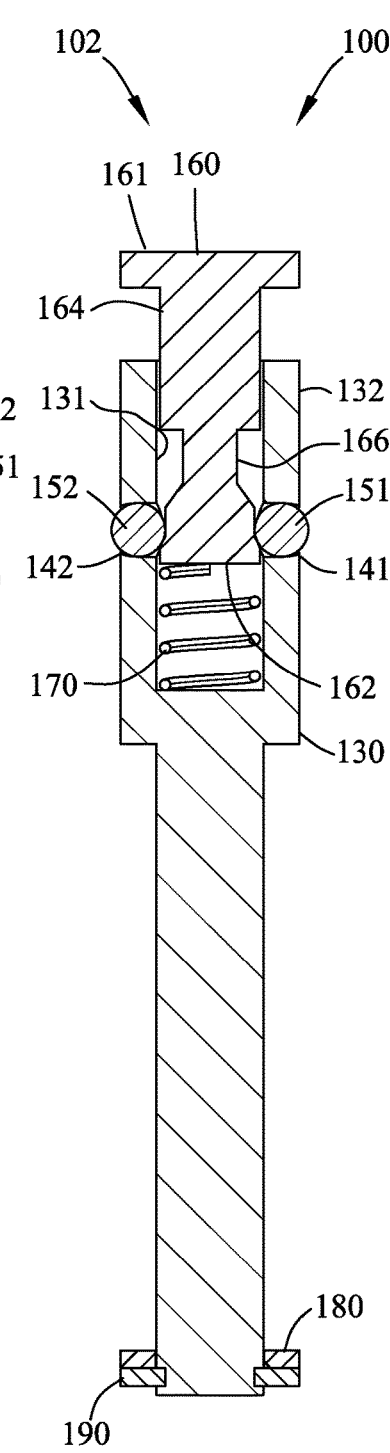
FIG. 18 is a sectional view along line 18-18 in FIG. 17.
Figure 19:
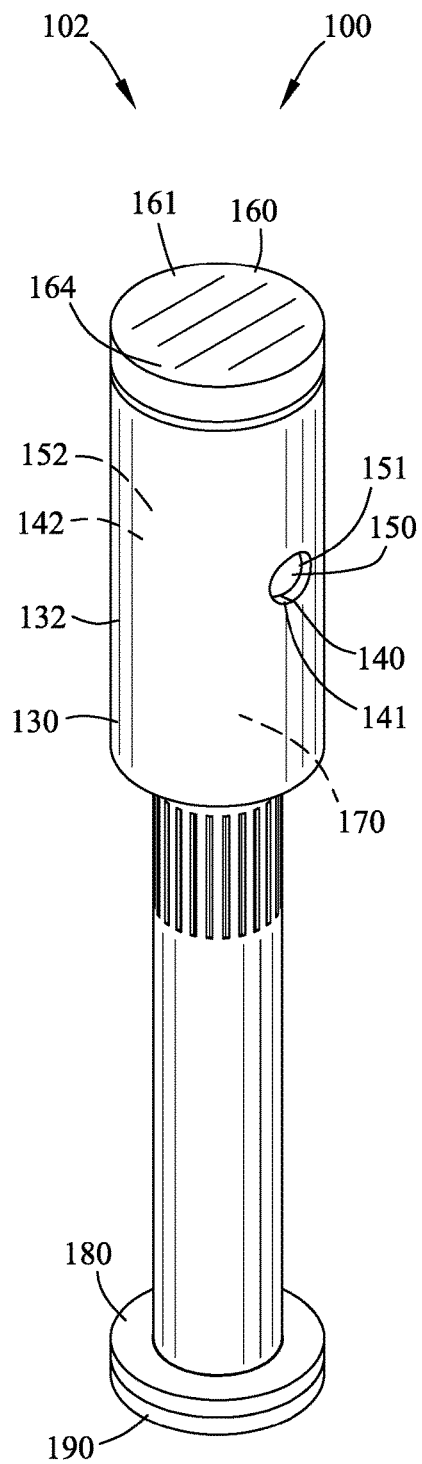
FIG. 19 is a view similar to FIG. 16 illustrating the depression of the actuator for decoupling the propeller from the motor as also shown in FIG. 4.
Figure 20:
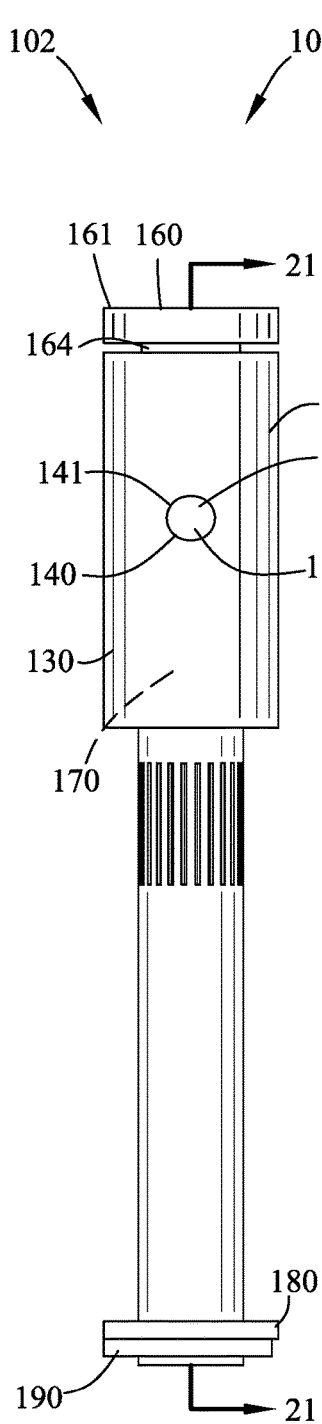
FIG. 20 is a side view of FIG. 19.
Figure 21:
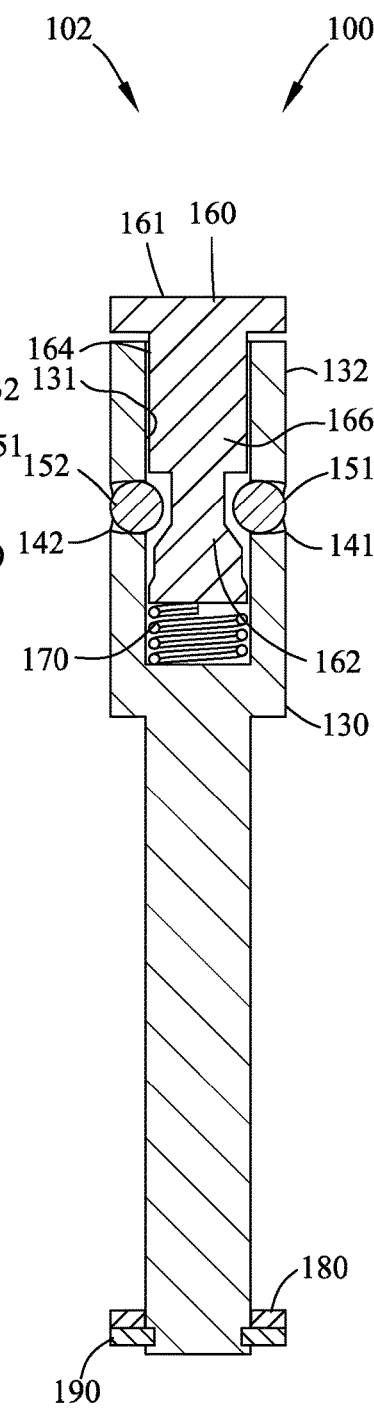
FIG. 21 is a sectional view along line 21-21 in FIG. 20.

FIGS. 12-14 are magnified views of the removal of the propeller 66 from the motor shown 61 in FIG. 5. The spring 170 axially returns the annular relief 166 to be to the non-depressed position whereat the annular relief 166 is displaced from the plurality of radial of radial apertures 141 and 142. The outer shaft surface 132 of the shaft 130 engages with the inner key portion of the plurality of radial keys 151 and 152 to extend the outer key portion of the plurality of radial keys 151 and 152 beyond the outer shaft surface 132 of the rotatable shaft 130.

A new propeller is installed on the rotatable shaft 130 in a reverse order. The hub of the new propeller is positioned onto the distal end of the rotatable shaft 130. The first end of the actuator 160 is depressed and the new propeller is moved into alignment with the plurality of radial apertures 141 and 142. Preferably, a stop or shoulder is provided to facilitate the alignment of the first and second keyways 121 and 122 with the plurality of radial apertures 141 and 142. Upon release of the actuator 160, the spring biasing the actuator 160 into the non-depressed position to axially displace the annular relief 166 from the plurality of radial apertures 141 and 142 to urge the plurality of radial keys 151 and 152 outwardly from the outer shaft surface 132 of the rotatable shaft 130, The operator then rotates the new propeller relative to the rotatable shaft 130 to align the plurality of radial keys 151 and 152 with the plurality of axial keyways 121 and 122. Upon the alignment of the plurality of radial keys 151 and 152 with the plurality of axial keyways 121 and 122, the plurality of radial keys 151 and 152 enter the plurality of axial keyways 121 and 122 upon the urging of spring 170 to couple the new propeller to the motor 61.

FIG. 22 is an enlarged exploded isometric view similar to FIG. 15 illustrating an alternate motor fastener 290 for securing the coupling of the present invention to the motor 61. In this example, the motor coupling portion 202 includes a circular flange 234 secured to an armature of the motor 61 by a plurality of fasteners shown as screws 292. The rotatable shaft 230 is secured to the circular flange 234. Preferably, the rotatable shaft 230 is unitary with the circular flange 234.

In this example, each of the first and second radial keys 151 and 152 are shown as cylinders but it should be understood that the first and second radial keys 151 and 152 make take a variety of shapes.

The actuator 260 extends between a first end 261 and a second end 262. The second end of the actuator 260 includes a retainer 280 shown as an enlarged projection for retaining the actuator 260 within the flange rotatable shaft 230 against the urging of the spring 270. The coupling 200 operates in a manner similar to the coupling 100 described heretofore.

The present invention provides an improved quick disconnect coupling for a propeller that is simple for the operator to use. The coupling is capable of accommodating different types of propellers. The propeller hub portion is suitable for use in concert with the motor coupling portion as well as being suitable for use with convention couplings as shown on FIG. 1.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claims is:

1. A coupling for connecting a propeller to a motor, comprising:
   a propeller coupling portion including:
      a propeller hub supporting a propeller blade;
      an inner propeller hub bore defining an axial keyway defined in said propeller hub;
   a motor coupling portion including:
      a rotatable shaft having an internal shaft bore connected for rotation with the motor;
      a radial aperture extending through said rotatable shaft;
      a radial key slidably located in said radial aperture;
      an actuator slidably mounted within said internal shaft bore of said rotatable shaft;
      said rotatable shaft partially engaging within said inner propeller hub bore in said propeller hub and configured for displacing said actuator through said inner propeller hub bore and positioning said actuator above said propeller hub;
      a first actuator defined by depressing said actuator above said propeller hub for retracting said radial key relative to an outer surface of said rotatable shaft for permitting said rotatable shaft to fully engage with said inner propeller hub bore in said propeller hub and the first actuator configured for rotating said propeller hub relative to said rotatable shaft to align said radial key with said axial keyway;
      a spring biasing said actuator into a non-depressed position for extending said radial key to engage with said axial keyway of said propeller hub bore to couple the propeller to the motor and prevent rotation of said propeller hub relative to said rotatable shaft;
      a second actuator defined by depressing said actuator above said propeller hub for retracting said radial key from said axial keyway and permitting removal of said propeller hub from said rotatable shaft; and
      said actuator located proximate to said radial key for permitting a depression of said actuator proximate to said propeller hub.

2. A coupling for connecting a propeller to a motor as set forth in claim 1, wherein said axial keyway extends only partially through said hub inner bore.

3. A coupling for connecting a propeller to a motor as set forth in claim 1, wherein said radial key is a sphere.

4. A coupling for connecting a propeller to a motor as set forth in claim 1, including a radial key stop for inhibiting removal of said radial key from said radial aperture.

5. A coupling for connecting a propeller to a motor as set forth in claim 1, wherein said actuator includes an annular relief defined in an actuator outer diameter of said actuator; and
   said annular relief enabling retracting and extension of said radial key relative to an outer surface of said rotatable shaft upon movement of said actuator between said depressed and non-depressed positions.

6. A coupling for connecting a propeller to a motor as set forth in claim 1, wherein said actuator includes an annular relief defined in an actuator outer diameter of said actuator;
   depression of said actuator aligning said annular relief adjacent relative to said radial aperture for retracting said radial key relative to said outer surface of said rotatable shaft for permitting said propeller hub bore to be introduced onto said rotatable shaft; and said spring biasing axially returning said annular relief to be adjacent to said plurality of radial apertures for extending said radial key to engage with said axial keyway of said propeller hub bore to couple the propeller to the motor.

7. A coupling for connecting a propeller to a motor as set forth in claim 1, including a retainer for retaining said actuator within said internal shaft bore of said shaft against the bias of said spring.

8. A coupling for connecting a propeller to a motor as set forth in claim 1, including a motor fastener for fastening said motor coupling portion to the motor.

9. A coupling for connecting a propeller to a motor as set forth in claim 1, wherein said rotatable shaft is an armature shaft of the motor.

10. A coupling for connecting a propeller to a motor, comprising:
   a propeller coupling portion including:
      a propeller hub having a propeller hub inner bore;
      a plurality of proper blades extending from said propeller hub;
      a plurality of axial keyways defined in said propeller hub inner bore;
   a motor coupling portion including:
      a rotatable shaft being connected for rotation with the motor;
      said rotatable shaft having an internal shaft bore and an outer shaft surface;
      a plurality of radial apertures extending from said internal shaft bore to said outer shaft surface defining a radial aperture length;
      a plurality of radial keys each having an inner key portion and an outer key portion defining a radial length greater than each of said radial aperture lengths;
      said plurality of radial keys slidably located in each of said plurality of radial apertures;
      an actuator having an actuator outer diameter slidably received with said internal shaft bore of said shaft;
      an annular relief defined in said actuator outer diameter of said actuator;
      said rotatable shaft partially engaging within said inner propeller hub bore in said propeller hub and configured for displacing said actuator through said inner propeller hub bore and positioning said actuator above said propeller hub;
      a first actuator defined by depressing said actuator above said propeller hub for retracting said plurality of radial keys to enter into said annular relief in said actuator to permit said propeller hub bore to be fully engaged onto said outer shaft surface of said rotatable shaft and the first actuator configured for rotating said propeller hub relative to said rotatable shaft to align said plurality of radial keys with said plurality of radial keyways;
      a spring biasing said actuator into an non-depressed position axially displacing said annular relief from said plurality of radial apertures to extend said plurality of radial keys and engage with said plurality of axial keyways defined in said propeller hub bore to couple the propeller to the motor and prevent rotation of said propeller hub relative to said rotatable shaft;
      a second actuator defined by depressing said actuator above said propeller hub for retracting said radial key from said axial keyway and permitting removal of said propeller hub from said rotatable shaft and;
      said actuator located proximate to said radial key for permitting a depression of said actuator proximate to said propeller hub.

11. A coupling for connecting a propeller to a motor as set forth in claim 10, wherein each of said plurality of axial keyways extends only partially through said hub inner bore defining an axial keyway endwall; and
   said plurality of axial keyway endwalls engaging with said plurality of radial keys for securing the propeller onto the rotatable shaft against the thrust of the propeller.

12. A coupling for connecting a propeller to a motor as set forth in claim 10, wherein each of said plurality of radial keys is a sphere.

13. A coupling for connecting a propeller to a motor as set forth in claim 10, including a plurality of radial key stops located proximate to said an outer shaft surface of said rotatable shaft for inhibiting removal of said plurality of radial keys from said plurality of radial apertures.

14. A coupling for connecting a propeller to a motor as set forth in claim 10, including a retainer for retaining said actuator within said internal shaft bore of said shaft against the bias of said spring.

15. A coupling for connecting a propeller to a motor as set forth in claim 10, including a motor fastener for fastening said motor coupling portion to the motor.

16. A coupling for connecting a propeller to a motor, comprising:
   a propeller coupling portion including:
      a propeller hub supporting a propeller blade;
      an inner propeller hub bore extending though said propeller hub and defining a keyway defined in said propeller hub;
   a motor coupling portion including:
      a flange connected for rotation with the motor;
      a rotatable shaft secured to said flange;
      said rotatable shaft having an internal shaft bore;
      an aperture extending between said internal shaft bore and an outer shaft surface of said rotatable shaft;
      a key slidably located in said aperture;
      an actuator slidably mounted within said internal shaft bore of said rotatable shaft;
      said rotatable shaft partially engaging within said inner propeller hub bore in said propeller hub;
      a first actuator defined by depressing said actuator for retracting said key relative to an outer shaft surface of said rotatable shaft for permitting said rotatable shaft to fully engage with said inner propeller hub bore in said propeller hub and the first actuator configured for rotating said propeller hub relative to said rotatable shaft to align said key with said keyway;
      a spring biasing said actuator into a non-depressed position for extending said key to engage with said keyway of said propeller hub bore to couple the propeller to the motor and prevent rotation of said propeller hub relative to said rotatable shaft;
      a second actuator defined by depressing said actuator for retracting said key from said keyway and permitting removal of said propeller hub from said rotatable shaft; and
      said actuator located proximate to said key for permitting a depression of said actuator proximate to said propeller hub.

17. A coupling for connecting a propeller to a motor, comprising:
   a propeller coupling portion including:

a propeller hub supporting a propeller blade;
an inner propeller hub bore extending though said propeller hub and defining a keyway defined in said propeller hub;
a motor coupling portion including:
   a rotatable shaft being connected for rotation with the motor;
   said rotatable shaft having an internal shaft bore;
   an aperture extending between said internal shaft bore and an outer shaft surface of said rotatable shaft;
   a key slidably located in said aperture;
   an actuator extending between a first end and a second end;
   a retainer coupled to said second end of said actuator;
   said actuator slidably mounted within said internal shaft bore of said rotatable shaft;
   said rotatable shaft partially engaging within said inner propeller hub bore in said propeller hub;
   a first actuator defined by depressing said actuator for retracting said key relative to an outer shaft surface of said rotatable shaft for permitting said rotatable shaft to fully engage with said inner propeller hub bore in said propeller hub and the first actuator configured for rotating said propeller hub relative to said rotatable shaft to align said key with said keyway;
   a spring biasing said actuator into a non-depressed position for extending said key to engage with said keyway of said propeller hub bore to couple the propeller to the motor and prevent rotation of said propeller hub relative to said rotatable shaft;
   a second actuator defined by depressing said actuator for retracting said key from said keyway and permitting removal of said propeller hub from said rotatable shaft;
   said actuator located proximate to said key for permitting a depression of said actuator proximate to said propeller hub; and
   said retainer of said actuator retaining the actuator within said rotatable shaft against the urging of said spring.

18. A coupling for connecting a propeller to a motor as set forth in claim 17, wherein said spring is positioned between the motor and said actuator.

* * * * *